US012264541B1

(12) United States Patent
Georges

(10) Patent No.: US 12,264,541 B1
(45) Date of Patent: Apr. 1, 2025

(54) LADDER SUPPORT APPARATUS, SYSTEM, AND METHOD

(71) Applicant: John Georges, Happy Valley, OR (US)

(72) Inventor: John Georges, Happy Valley, OR (US)

( * ) Notice: Subject to any disclaimer, the term of this patent is extended or adjusted under 35 U.S.C. 154(b) by 1152 days.

(21) Appl. No.: 17/091,694

(22) Filed: Nov. 6, 2020

Related U.S. Application Data

(63) Continuation-in-part of application No. 15/990,588, filed on May 25, 2018, now abandoned.

(60) Provisional application No. 62/511,915, filed on May 26, 2017.

(51) Int. Cl.
*E06C 7/44* (2006.01)
*E06C 7/42* (2006.01)
*E06C 7/46* (2006.01)
*E06C 7/48* (2006.01)

(52) U.S. Cl.
CPC ................ *E06C 7/423* (2013.01); *E06C 7/46* (2013.01); *E06C 7/48* (2013.01); *E06C 7/44* (2013.01)

(58) Field of Classification Search
CPC .................................. E06C 7/423; E06C 7/42
See application file for complete search history.

(56) References Cited

U.S. PATENT DOCUMENTS 3,012,628 A * 12/1961 Zumbaum ............... E06C 7/423 182/172
3,288,249 A * 11/1966 Gibson ..................... E06C 7/48 182/214
3,568,798 A * 3/1971 Pierce ....................... E06C 1/20 182/172
3,933,221 A * 1/1976 Sorenson .................. E06C 7/44 182/172
4,091,893 A * 5/1978 Neal ......................... E06C 7/44 182/204
4,423,797 A * 1/1984 Batten ....................... E06C 7/44 182/204
4,519,477 A * 5/1985 Ralston ................... E06C 7/423 182/172
4,632,220 A 12/1986 Murrell
5,165,501 A * 11/1992 Donahey ................ E06C 7/423 182/214
5,305,977 A * 4/1994 Roth ....................... E06C 7/146 248/210
5,423,397 A * 6/1995 Boughner ................. E06C 7/44 182/172
5,609,222 A * 3/1997 Horbacewicz ............ E06C 7/44 182/109
5,715,908 A * 2/1998 Sager ........................ E06C 7/44 182/172
5,931,259 A * 8/1999 Hoey ........................ E06C 7/48 248/210

(Continued)

*Primary Examiner* — Colleen M Chavchavadze
(74) *Attorney, Agent, or Firm* — Renaissance IP Law Group, LLP; David A. Crowther

(57) ABSTRACT

A support system for providing support to a ladder. The support system includes at least one support arm, at least one support leg, at least one support base, and at least one support bracket. The support leg is removably attached to a lower end of the at least one support arm. The support base is coupled to the at least one support leg and has a plurality of ridge on its lower surface. The support bracket is removably attached to the upper end of the at least one support arm. Altogether, the components of the support system are configured to provide support and relative stability to a ladder.

17 Claims, 17 Drawing Sheets

(56) References Cited

U.S. PATENT DOCUMENTS

| | | | | |
|---|---|---|---|---|
| 6,688,797 | B2 * | 2/2004 | Park | F16C 11/10 403/93 |
| 6,851,518 | B1 * | 2/2005 | Walker | E06C 7/48 248/210 |
| 6,857,503 | B2 * | 2/2005 | Simpson | E06C 1/18 182/178.3 |
| 7,047,597 | B2 * | 5/2006 | Lee | E06C 1/32 16/233 |
| 7,093,690 | B2 * | 8/2006 | Swann | E06C 7/46 182/172 |
| 7,216,742 | B2 * | 5/2007 | Spengler | E06C 7/423 182/172 |
| 7,293,630 | B1 * | 11/2007 | Trebec | E06C 7/423 182/172 |
| 8,157,055 | B2 * | 4/2012 | Stark | E06C 7/14 182/129 |
| 8,424,642 | B2 * | 4/2013 | Lietz | E06C 7/46 182/172 |
| 9,010,491 | B2 * | 4/2015 | Trang | E06C 7/46 182/201 |
| 9,482,053 | B2 * | 11/2016 | Polzen | E06C 7/188 |
| 9,810,023 | B2 * | 11/2017 | Stewart | E06C 7/42 |
| 10,487,576 | B2 * | 11/2019 | Ballard | E06C 1/22 |
| 10,519,716 | B2 * | 12/2019 | Saxby | E06C 7/423 |
| 11,230,849 | B1 * | 1/2022 | Smith | E04G 1/152 |
| 11,505,994 | B2 * | 11/2022 | Foley | E06C 1/22 |
| 2004/0231921 | A1 | 11/2004 | Ramirez | |
| 2005/0121261 | A1 * | 6/2005 | Moss | E06C 7/423 182/165 |
| 2005/0274571 | A1 * | 12/2005 | Simpson | E06C 7/083 182/23 |
| 2005/0284703 | A1 * | 12/2005 | Deuer | E06C 7/186 182/206 |
| 2008/0000721 | A1 * | 1/2008 | Deal | E06C 7/423 182/109 |
| 2009/0057057 | A1 * | 3/2009 | Sracic | E06C 7/12 182/141 |
| 2009/0107765 | A1 | 4/2009 | Germond | |
| 2009/0188752 | A1 * | 7/2009 | Stark | E06C 7/48 182/129 |
| 2010/0213007 | A1 | 8/2010 | Richards | |
| 2011/0017549 | A1 * | 1/2011 | Lietz | E06C 7/10 182/172 |
| 2011/0067954 | A1 * | 3/2011 | Deal | E06C 7/48 182/172 |
| 2013/0068560 | A1 | 3/2013 | Estep | |
| 2016/0281427 | A1 * | 9/2016 | Weatherall | E06C 7/42 |
| 2017/0254145 | A1 * | 9/2017 | Ballard | E06C 1/22 |
| 2018/0195344 | A1 * | 7/2018 | Wilkinson | E06C 7/44 |
| 2019/0055784 | A1 * | 2/2019 | Kazanjian | E06C 1/06 |
| 2020/0063494 | A1 * | 2/2020 | Brudzinski | E06C 7/44 |
| 2020/0087985 | A1 * | 3/2020 | Polzen | E06C 7/46 |
| 2021/0381312 | A1 * | 12/2021 | Mattsson | E06C 7/423 |
| 2023/0032716 | A1 * | 2/2023 | Jasak | E06C 7/486 |

* cited by examiner

LADDER SUPPORT APPARATUS, SYSTEM, AND METHOD

CROSS-REFERENCE TO RELATED APPLICATION(S)

The present application is a continuation-in-part of U.S. patent application Ser. No. 15/990,588, filed on May 25, 2018, which claims the benefit of U.S. Provisional Patent Application No. 62/511,925, filed May 26, 2017, which are incorporated by reference herein in their entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of ladders of existing art and more specifically relates to ladder stabilizers.

RELATED ART

Many people use ladders to reach places that are too high for someone to reach without aid. A ladder is a vertical or inclined set of rungs or steps. They are commonly made of metal, wood, or fiberglass, and they have also been known to be made of 'tough' plastic. When a full-size ladder is not necessary, a step stool may be used.

Most extension ladders are not designed with safety in mind. If people apply too much weight to one side of a ladder, it can tip. Likewise, when used on uneven terrain, the ladder can tip. Some people may try to shimmy the ladder a certain way or attempt to balance the ladder with makeshift supports, but this isn't very safe. Unfortunately, if ladders crash down, they can not only break or cause damage to surrounding equipment but also cause minor to severe injuries to the user. An effective alternative is needed.

U.S. Pub. No. 2004/0231921 to Paul Ramirez relates to an outrigger stabilizer and ladder combination. The described outrigger stabilizer and ladder combination includes an outrigger stabilizer combined with a ladder that includes a telescoped outer tube and inner elongated member with a one way brake freely allowing telescoping movement of the inner member out of the outer tube to automatically adjust to engage the ground but instantly locking together when any collapsing movement is attempted to brace the ladder in any adjusted position.

SUMMARY OF THE INVENTION

In view of the foregoing disadvantages inherent in the known ladder stabilizer art, the present disclosure provides a novel ladder support system and method. The general purpose of the present disclosure, which will be described subsequently in greater detail, is to provide extra support and stability to an extension ladder on either side to help prevent horizontal movement, sliding, or even twisting.

A support system for providing support to a ladder is disclosed herein. The support system may include at least one support arm, at least one support leg, at least one support base, and at least one support bracket. The support leg may be removably attached to a lower end of the at least one support arm. The support base may be coupled to the at least one support leg and may have a plurality of ridge on its lower surface. The support bracket may be removably attached to the upper end of the at least one support arm. Altogether, the components of the support system may be configured to provide support and relative stability to a ladder.

According to another embodiment, a method of using a support system for a ladder is also disclosed herein. The method of using a support system for a ladder may include providing at least one support arm from the support system and attaching the at least one support arm from the support system to a ladder for use.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a ladder support system and method, constructed and operative according to the teachings of the present disclosure.

The various embodiments of the present invention will hereinafter be described in conjunction with the appended drawings, wherein like designations denote like elements.

DETAILED DESCRIPTION

Figure 1:
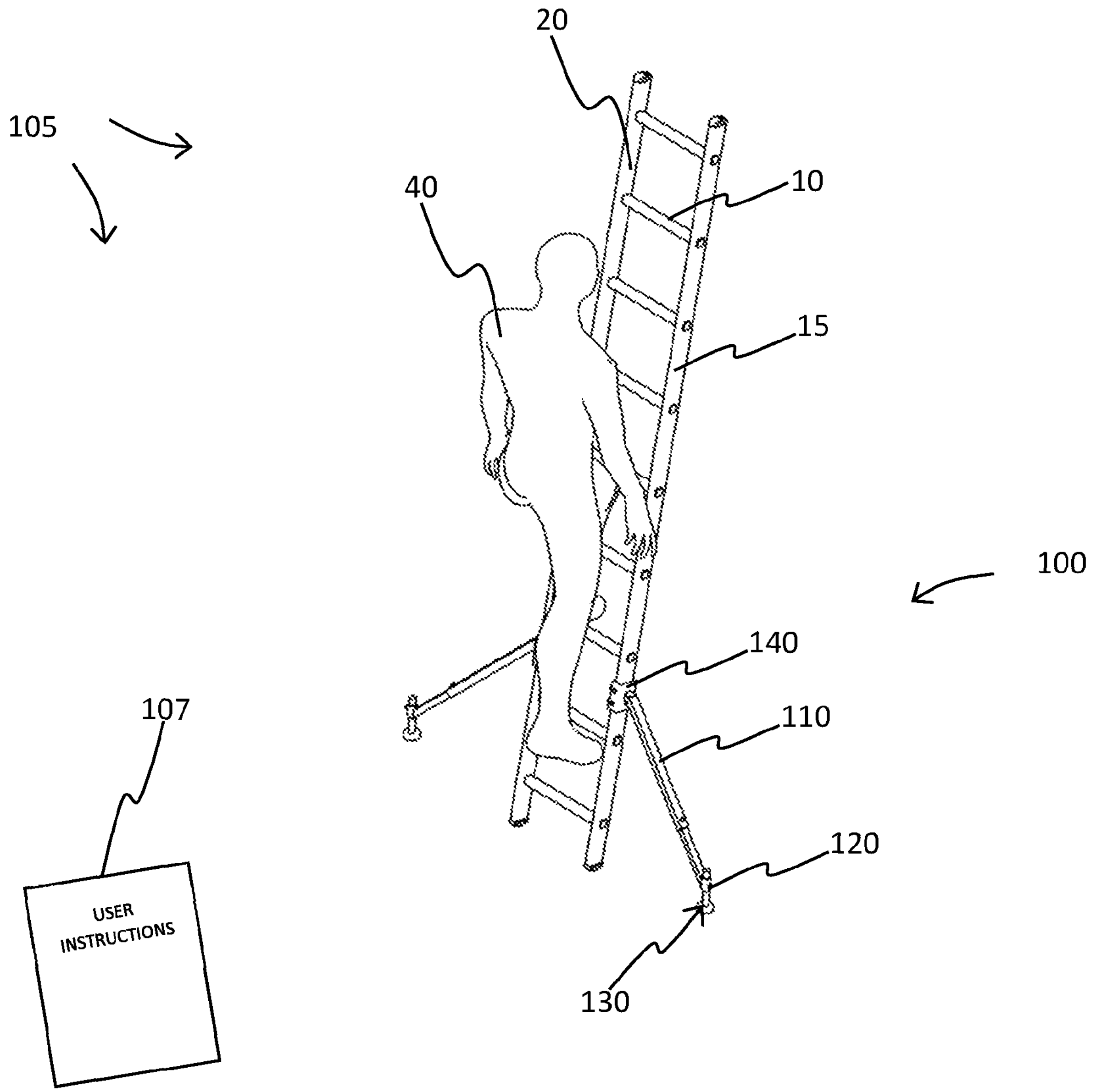
FIG. 1 is a perspective view of the ladder support system during an 'in-use' condition, according to an embodiment of the disclosure.

As discussed above, embodiments of the present disclosure relate to a ladder stabilizer and more particularly to a ladder support system and method as used to provide extra support and stability to an extension ladder on either side to help prevent horizontal movement, sliding, or even twisting.

Generally, the present invention supports an extension ladder on either side for superior safety and ease of use. As designed, this system may prevent a ladder from tipping over, sliding out, or even twisting. It may reduce damage to ladders from wipe outs and accidents. This system may further eliminate the need for help from another person, increasing speed and efficiency on the job. The present invention enables the use of ladders on uneven terrain or other questionable surfaces.

The support system may be particularly useful in helping to stabilize a ladder for enhanced support on a variety of terrains. This innovative product may comprise an extension ladder support, made preferably from aluminum or other suitable material. The support can include a mounting assembly, adjustable support arm, and a leg apparatus that makes contact with the ground. The mounting assembly can include a number of hooks, screw clamps, and other coupling mechanisms useful for removably and adjustably mounting the support to almost any area of an extension ladder, including the sidewalls, step supports, and base frame. The mounting assembly may further include a hinge mechanism, allowing the device to be adjusted across multiple planes. The adjustable support arm can include a telescoping bracket that allows the device to be extended outwardly. The leg apparatus can include levelers with a spring insert for adapting to uneven terrain and increasing support. On the bottom of the apparatus can be a textured, nonslip material.

The support system may also include additional bracing arms or supports that connect the support arms to the support bracket. Each support bracket may be configured as a single coupling mechanism or as an extended plate to provide support down the long axis of the ladder. The extended plate may be conjoined with the support arm of the support system by means of a secondary brace. The secondary brace may for a triangle in relation to the support arm and the extended plate for additional strength and stability. The secondary brace and extended plate for coupling with the ladder frame may be optional and not necessarily included in all embodiments of this system.

The support system may be used in orthogonal relation to the long axis of the ladder that it is attached to. The supports generally extend at an angle, thereby providing the maximum amount of stability in a variety of situations. In a preferred embodiment, the support system may be positioned on each side of the ladder to angle forwards from the ladder (in the same direction as the ladder) at an angle of approximately 30 degrees. This configuration may allow for even more support still as the support arms would remain relationally about the ladder in a manner that may be beneficial to bearing additional loads or providing lateral stability. The supports may be used in pairs on both sides of the ladder, with each support having the ability to be attached at separate locations on a ladder. This independent attachment configuration may again be useful for providing maximum support on uneven terrain. Upon reading this specification, it should be appreciated that, under appropriate circumstances, considering such issues as user preferences, design preference, structural requirements, marketing preferences, cost, available materials, technological advances, etc., other ladder support arrangements such as, for example, alternative rotator assemblies, etc., may be sufficient.

Referring now more specifically to the drawings by numerals of reference, there is shown in FIGS. 1-4, various views of a support system 100.

FIG. 1 shows a support system 100 during an 'in-use' condition 50, according to an embodiment of the present disclosure. Here, the support system 100 may be beneficial for use by a user 40 to provide extra support and stability to an extension ladder on either side to help prevent horizontal movement, sliding, or even twisting. As illustrated, the support system 100 for providing support to a ladder 10 may include at least one support arm 110, at least one support leg 120, at least one support base 130, and at least one support bracket 140. The at least one support bracket 140 may be positioned couple with and pivot relative to a first ladder leg 15. A second support arm 110 may be used in conjunction on a second ladder leg 20 for additional support to the ladder 10.

According to one embodiment, the support system 100 may be arranged as a kit 105. In particular, the support system 100 may further include a set of instructions 107. The instructions 107 may detail functional relationships in relation to the structure of the support system 100 such that the support system 100 can be used, maintained, or the like, in a preferred manner.

Figure 2:
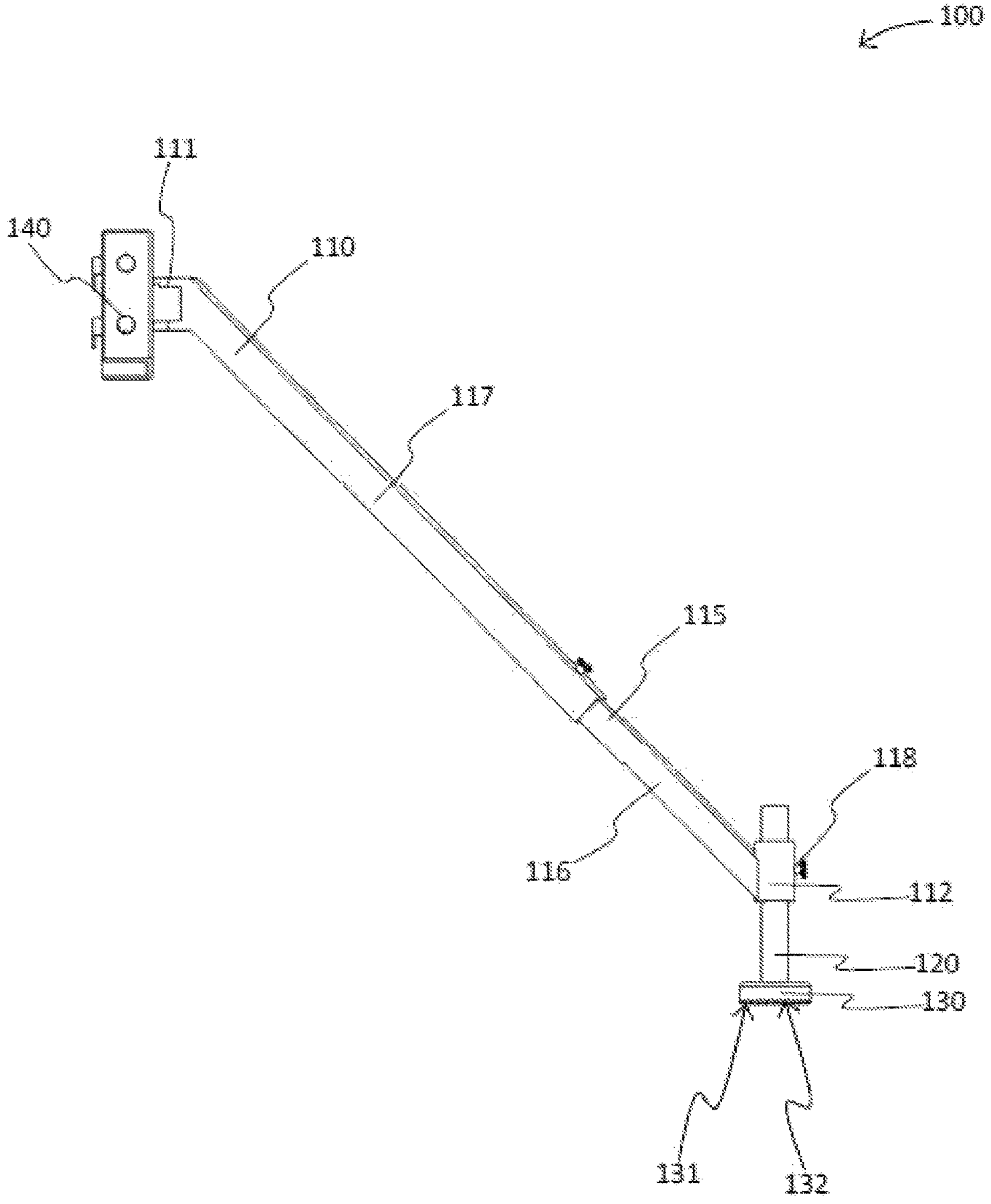
FIG. 2 is a side view of the ladder support system of FIG. 1, according to an embodiment of the present disclosure.

Referring now to FIG. 2 showing the support system 100 of FIG. 1, according to an embodiment of the present disclosure. As above, the support system 100 may include at least one support arm 110 having an upper end 111 and a lower end 112, at least one support leg 120, at least one support base 130, and at least one support bracket 140. The at least one support arm 110 may be configured as a telescoping support arm 115. The at least one support arm 110 may also be comprised of two sections including a first section 116, which may be smaller in size than a second section 117. The support system 100 may also include a fastening means 118 located on the lower end 112 of the at least one support arm 110. The fastening means 118 may be useful for removably attaching the at least one support arm 110 to the at least one support leg 120. The at least one support leg 120 may be coupled to the at least one support base 130. The at least one support base 130 may include a lower surface 132 that has a plurality of ridges 131 for improved traction on a variety of terrain types.

Figure 3:
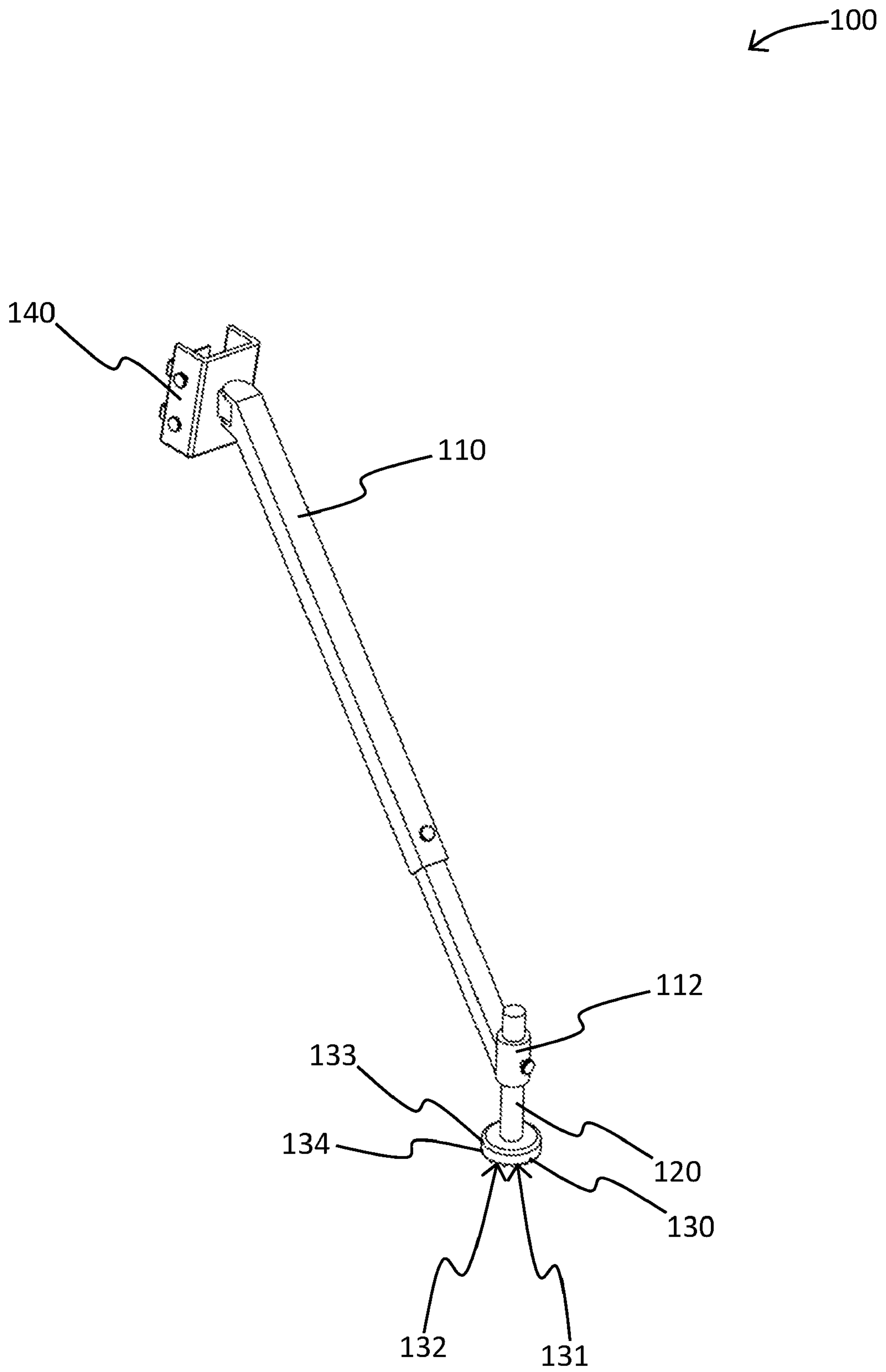
FIG. 3 is a top perspective view of the ladder support system of FIG. 1, according to an embodiment of the present disclosure.

FIG. 3 is a top perspective view of the support system 100 of FIG. 1, according to an embodiment of the present disclosure. Here again, the support system 100 may include at least one support arm 110 having an upper end 111 and a lower end 112, at least one support leg 120, at least one support base 130, and at least one support bracket 140. The at least one support base 130 may include a lower surface 132 that has a plurality of ridges 131 arranged in a radial configuration 133. For additional support, the lower surface 132 of the at least one support base 130 may be made of a non-slip material 134.

Figure 4A:
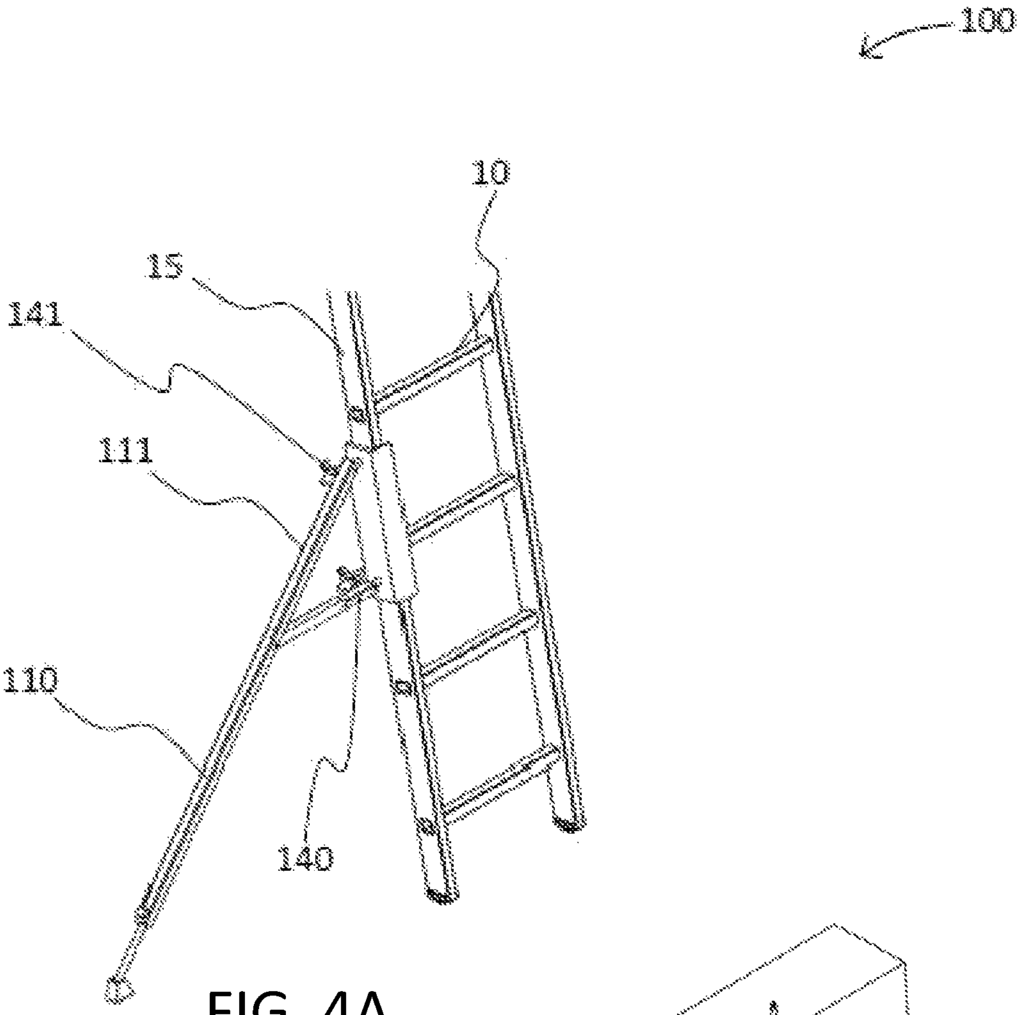
FIG. 4A and FIG. 4B are perspective views of the ladder support system of FIG. 1, according to an embodiment of the present disclosure.

Referring now to FIG. 4A, a perspective view of the support system 100 of FIG. 1, according to an embodiment of the present disclosure. As above, the support system 100 may include at least one support arm 110 having an upper end 111. The at least one support bracket 140 may be removably attached to the upper end 111 of the at least one support arm 110. The at least one support bracket 140 may also include a coupling means 141 that is useful for joining the at least one support arm 110 to a first ladder leg 15 of a ladder 10.

Figure 4B:
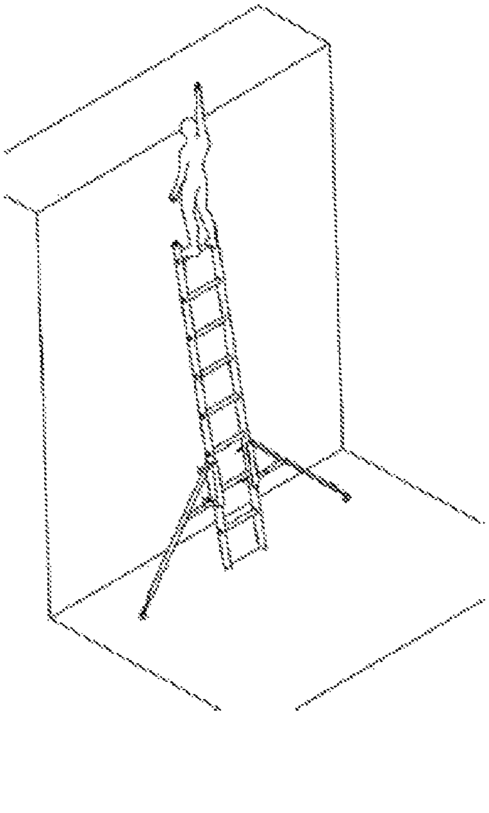

FIG. 4B is a perspective view of the support system 100 of FIG. 1, according to an embodiment of the present disclosure. Here again, the support system 100 is shown in use to provide a secondary illustration of the support system 100 and how it may provide additional lateral stability to help keep a ladder from sliding sideways or in a direction away from where it is leaning.

Figure 5:
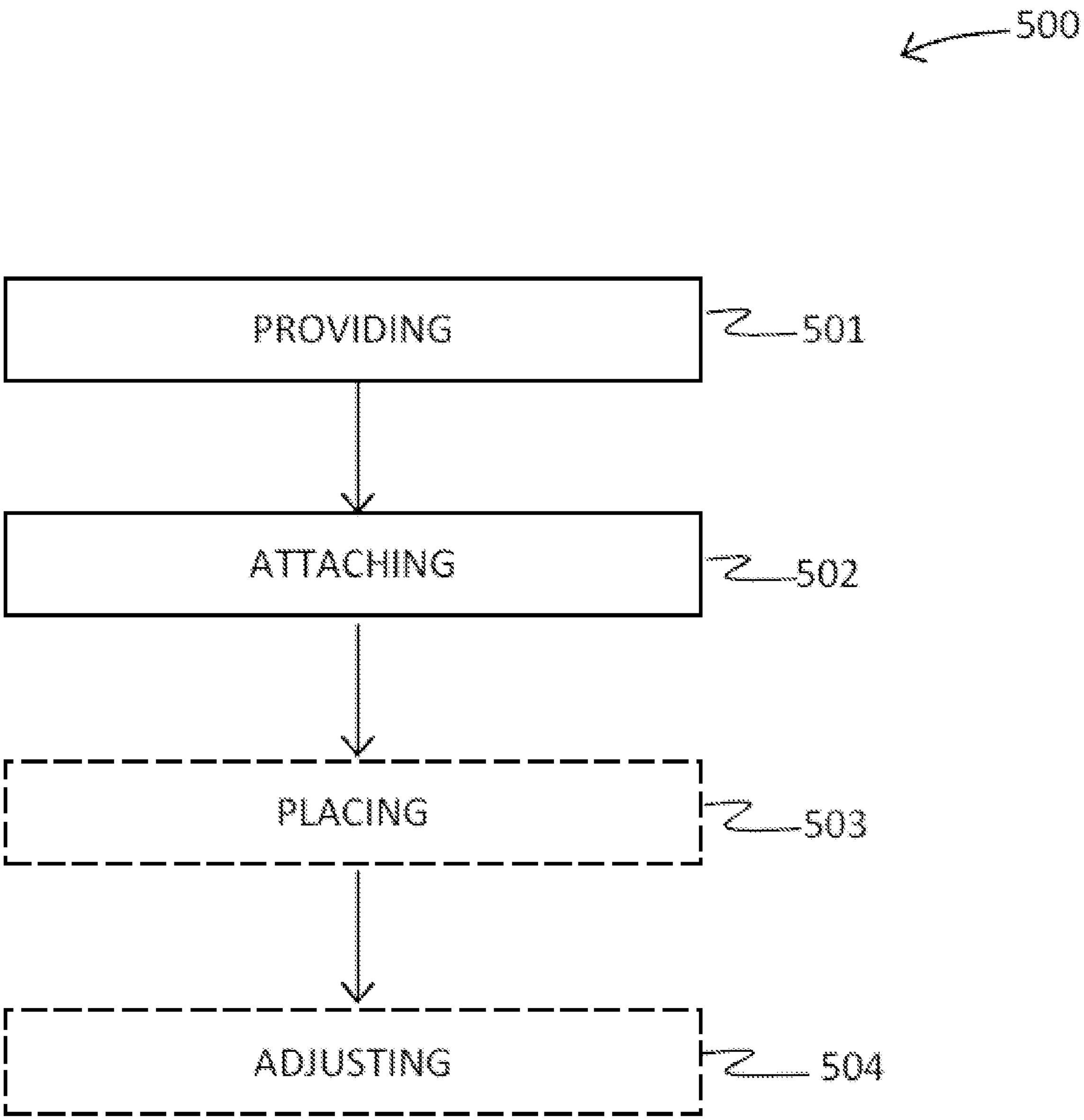
FIG. 5 is a flow diagram illustrating a method of using the support system for a ladder, according to an embodiment of the present disclosure.

FIG. 5 is a flow diagram illustrating a method 500 of using a support system 100 for a ladder 10, according to an embodiment of the present disclosure. In particular, the method 500 of using a support system 100 may include one or more components or features of the support system 100 as described above. As illustrated, the method 500 of using a support system 100 may include the steps of: step one 501, providing at least one support arm, the at least one support arm having an upper end and a lower end, at least one support leg, the at least one support leg being removably attached to the lower end of at least one support arm, at least one support base, the at least one support base being coupled to the at least one support leg and having a plurality of ridges on a lower surface of the support base, and at least one support bracket, the at least one support bracket being removably attached to the upper end of the at least one support arm; and step two 502, attaching the support system to the ladder.

It should be noted that step 503, placing the ladder in a desired work area, and step 504, adjusting the at least one support arm and at least one support leg to a desired position, are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112 (f). It should also be noted that, under appropriate circumstances, considering such issues as design preference, user preferences, marketing preferences, cost, structural requirements, available materials, technological advances, etc., other methods for the support system 100, are taught herein.

Figure 6:
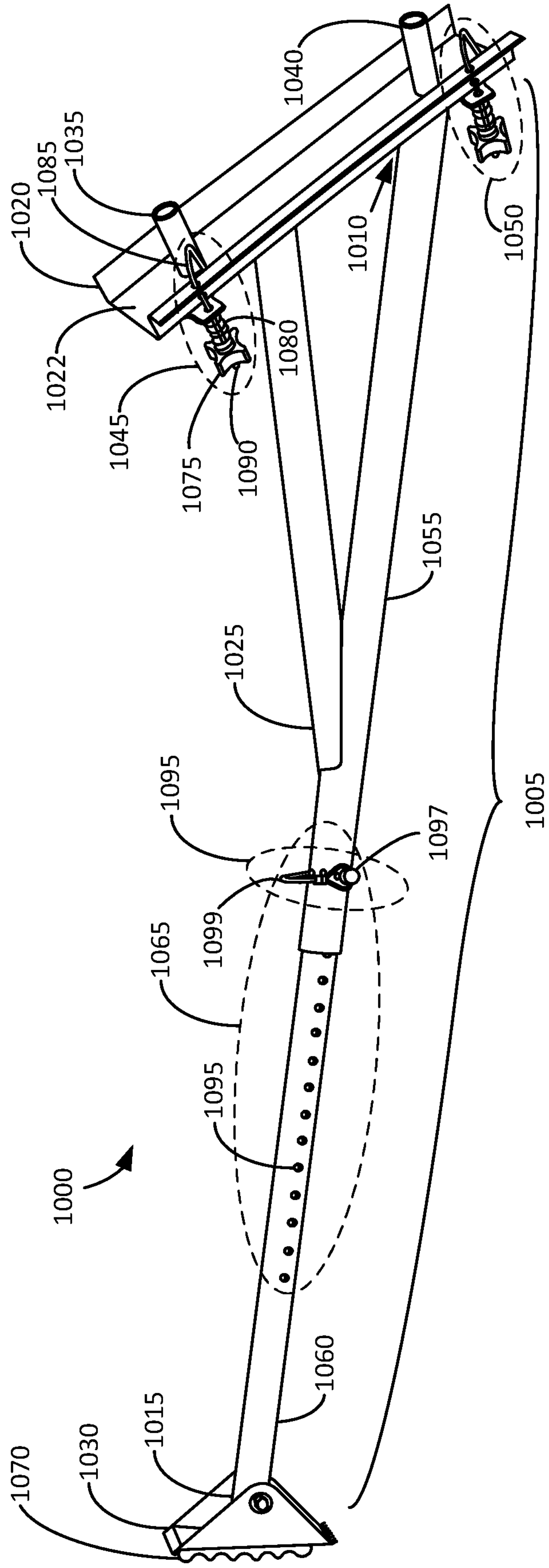
FIG. 6 is a perspective view of a ladder stabilizer unit according to an embodiment of the present disclosure.
Figure 7:
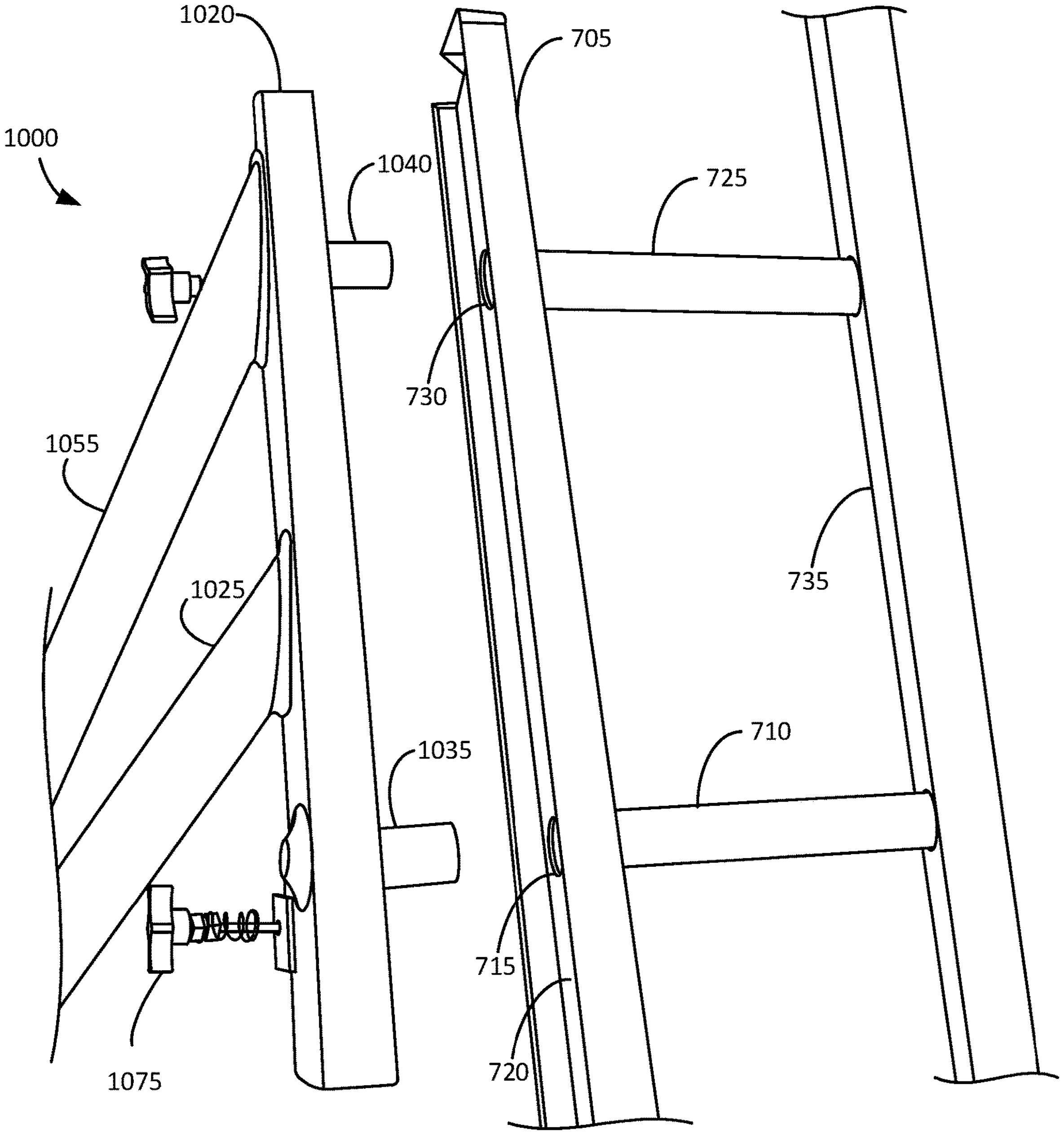
FIG. 7 is a perspective view of a section of the ladder stabilizer unit of FIG. 6 next to a ladder according to an embodiment of the present disclosure.

FIG. 6 is a perspective view of a ladder stabilizer unit 1000 according to an embodiment of the present disclosure. FIG. 7 is a perspective view of a section of the ladder stabilizer unit 1000 of FIG. 6 next to a ladder 705 according to an embodiment of the present disclosure. Reference is now made to FIGS. 6 and 7.

The ladder stabilizer unit 1000 can provide support to the ladder 705 against a structure, for example. The ladder 705 can be an extension ladder, for example, which conventionally does not have any inherent stability mechanism. The ladder stabilizer unit 1000 can include a leg member 1005 having a first end 1010 and a second end 1015. The ladder stabilizer unit 1000 can include a bracket member 1020 attached to the first end 1010 of the leg member 1005. The ladder stabilizer unit 1000 can include a support arm member 1025 attached to the leg member 1005 and to the bracket member 1020. The ladder stabilizer unit 1000 can include a foot member 1030 attached to the second end 1015 of the leg member 1005. The ladder stabilizer unit 1000 can include a first extension member 1035 that extends from a surface 1022 of the bracket member 1020. The ladder stabilizer unit 1000 can include a second extension member 1040 that extends from the surface 1022 of the bracket member 1020. The ladder stabilizer unit 1000 can include first fastening means 1045 for attaching the bracket member 1020 to the ladder 705. The ladder stabilizer unit 1000 can include second fastening means 1050 for attaching the bracket member 1020 to the ladder 705.

In some embodiments, the first extension member 1035 can be inserted into a first rung 710 of the ladder 705. For example, the first rung 710 of the ladder 705 can include a hollow space therein, having an opening 715 through a side rail 720 of the ladder 705. The first extension member 1035 can thereby prevent the bracket member 1020 from sliding up or down the side rail 720 of the ladder 705. This provides an extremely secure safety feature. The second extension member 1040 can be inserted into a second rung 725 of the ladder 705 through an opening 730. The second extension member 1040 can thereby further prevent the bracket member 1020 from sliding up or down the side rail 720 of the ladder 705. This provides even more anti-slide-proof protection.

The first fastening means 1045 can fasten the bracket member 1020 to the side rail 720 of the ladder 705, and the second fastening means 1050 can also fasten the bracket member 1020 to the side rail 720 of the ladder 705. The leg member 1005 can include a first section 1055 and a second section 1060. In some embodiments, the second section 1060 is smaller in size than the first section 1055. For example, the second section 1060 can have a smaller diameter than the first section 1055. The second section 1060 can partially fit within the first section 1055. The first section 1055 can be removably attached to the second section 1060 using an attachment means 1065. The foot member 1030 can include a plurality of ridges 1070 of non-slip material on a surface thereof. A second ladder stabilizer unit 1000 similar to or the same as the ladder stabilizer unit 1000 can be attached to a second rail 735 of the ladder 705, as further described below.

The first fastening means 1045 can include a first knob 1075, a first spring 1080, a first hook 1085, and a first shaft 1090. The first knob 1075 can be attached to the first shaft 1090. The first spring 1080 can be disposed between the first knob 1075 and the bracket member 1020. The first knob

1075 can compress the first spring 1080. In other words, a user can press on the first knob 1075, causing the first spring 1080 to compress, and the first hook 1085 to extend outward from the bracket member 1020. The first hook 1085 can be connected to the first shaft 1090, and can extend and hook the side rail 720 of the ladder 705 such that the bracket member 1020 is held in contact with the side rail 720 by decompression of the first spring 1080, as further shown and described below. The second fastening means 1050 can include similar or same components of the first fastening means 1045, and can operate in a similar fashion. Therefore, a description of such components and operation is not repeated.

The leg member 1005 can include the first section 1055 and the second section 1060. The second section 1060 can be smaller in size than the first section 1055. The second section 1060 can partially fit within the first section 1055. The second section 1060 can include one or more holes 1095 that extend through the second section 1060. The first section 1055 can be removably attached to the second section 1060 using the attachment means 1065. The attachment means 1065 can include a locking mechanism 1095 having a pin 1097 and a bow 1099. The pin 1097 can extend through the one or more holes 1095. The bow 1099 can hold the pin 1097 in the one or more holes 1095. The bow 1099 can be partially removed from the pin 1097. For example, the bow 1099 can be detached from one end of the pin 1097 so that the pin 1097 can be slid out of the one or more holes 1095. Otherwise, when the bow 1099 is attached to the ends of the pin 1097, and the pin 1097 is located in the one or more holes 1095, the second section 1060 can be secured in a fixed position relative to the first section 1055.

Figure 8:
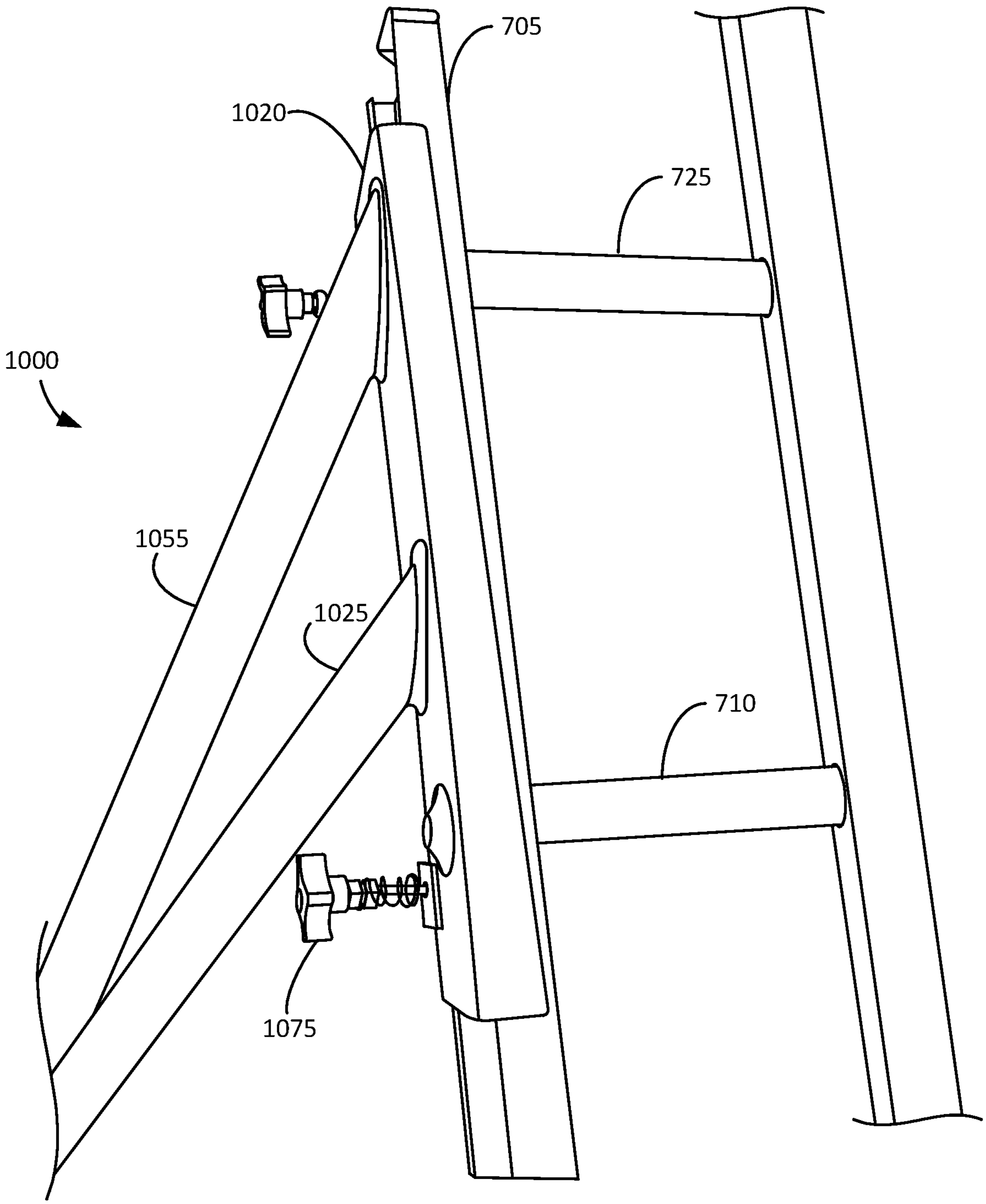
FIG. 8 is a perspective side view of a section of the ladder stabilizer unit attached to the ladder according to an embodiment of the present disclosure.
Figure 9:
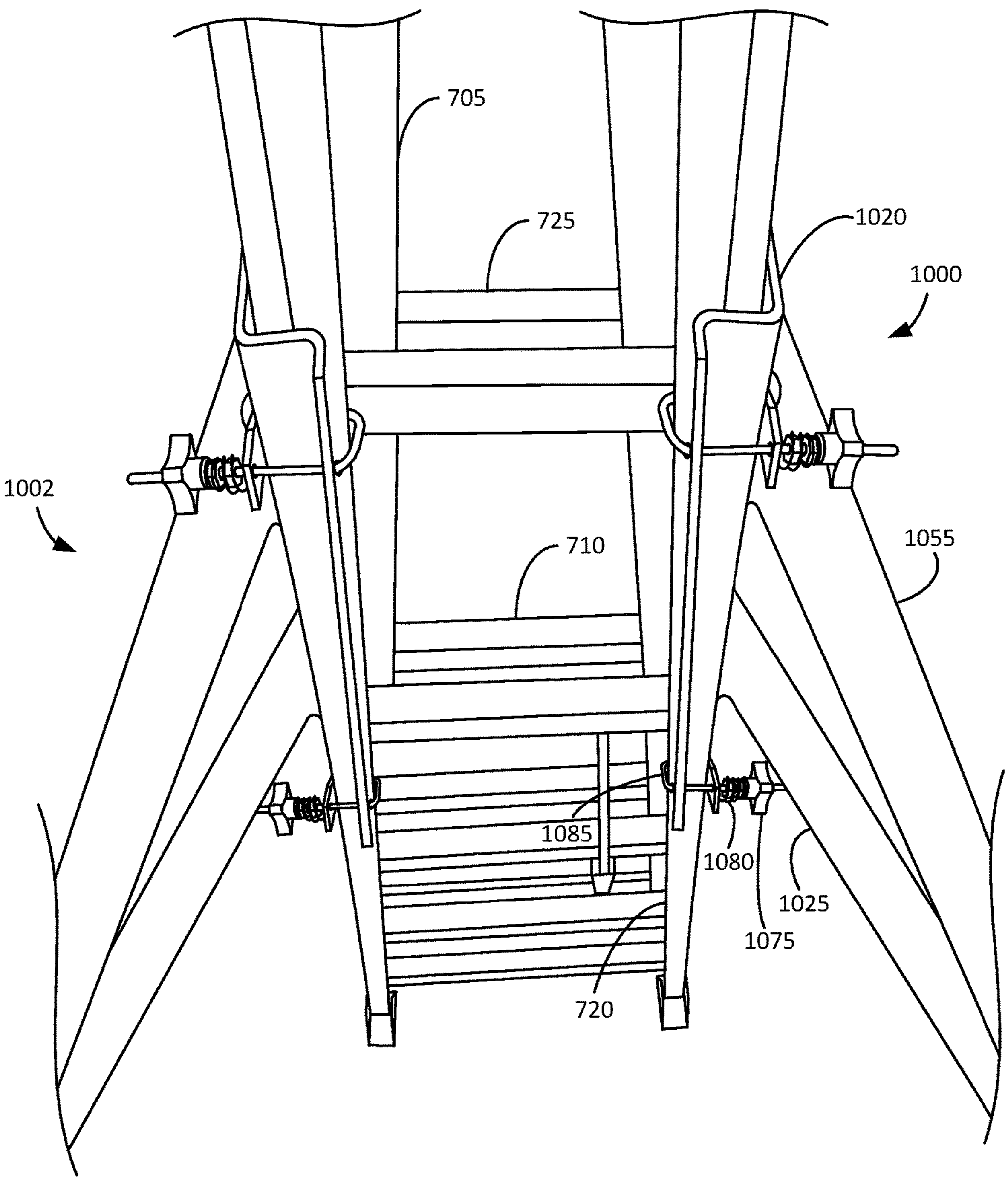
FIG. 9 is a perspective back view of a section of the ladder stabilizer unit and another ladder stabilizer unit, each of which is attached to the ladder according to an embodiment of the present disclosure.

FIG. 8 is a perspective side view of a section of the ladder stabilizer unit 1000 attached to the ladder 705 according to an embodiment of the present disclosure. FIG. 9 is a perspective back view of a section of the ladder stabilizer unit 1000 and a ladder stabilizer unit 1002, each of which is attached to the ladder 705 according to an embodiment of the present disclosure. Reference is now made to FIGS. 8 and 9.

When the ladder stabilizer unit 1000 and the ladder stabilizer unit 1002 are attached to the ladder 705, they can neither slide up or down, or away from the ladder 705. One or more of the hooks (e.g., 1085) can hook at least partially around the side rail 720 of the ladder 705. The knob (e.g., 1075) can be pressed by a user toward the side rail 720, thereby extending the hook (e.g., 1085). Once the hook (e.g., 1085) is positioned by the user, the user can release the knob (e.g., 1075), thereby causing the spring (e.g., 1080) to at least partially decompress. The decompression of the spring (e.g., 1080) can create tension between the hook (e.g., 1085) and the side rail 720 of the ladder 705, thereby causing the bracket member 1020 to hug the side rail 720 of the ladder 705. The user can perform the same action with each of the other knobs and springs, thereby securely attaching the ladder stabilizer unit 1000 and the ladder stabilizer unit 1002 to the ladder 705.

The first extension member 1035 (e.g., of FIG. 7) can be inserted into the first rung 710 of the ladder 705. The second extension member 1040 (e.g., of FIG. 7) can be inserted into the second rung 725 of the ladder 705 that is different from the first rung 710. A third extension member associated with the ladder stabilizer unit 1002 can be inserted into the first rung 710. A fourth extension member associated with the ladder stabilizer unit 1002 can be inserted into the second rung 725. In this configuration, the ladder stabilizer unit 1000 can substantially mirror the ladder stabilizer unit 1002.

Figure 10:
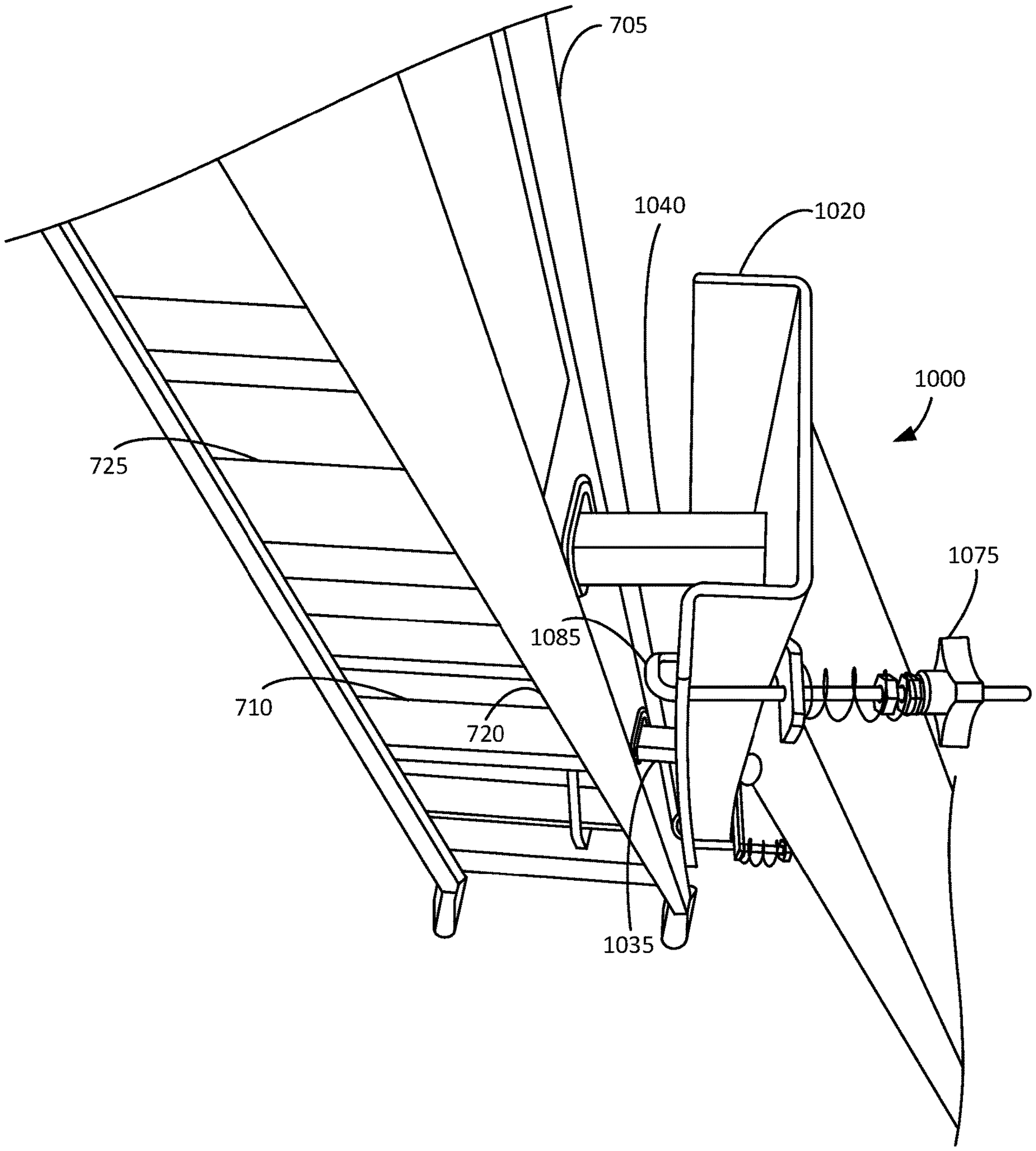
FIG. 10 is a perspective side view of a section of the ladder stabilizer unit being detached from the ladder according to an embodiment of the present disclosure.

FIG. 10 is a perspective side view of a section of the ladder stabilizer unit 1000 being detached from the ladder 705 according to an embodiment of the present disclosure. To detach the ladder stabilizer unit 1000 from the ladder 705, a user can push on each knob (e.g., 1075), thereby extending the hook (e.g., 1085) beyond the side rail 720 of the ladder 705. In some embodiments, the knob 1075 can be twisted to pivot the hook 1085 so that it doesn't catch on the side rail 720 when the ladder stabilizer unit 1002 is pulled away from the ladder 705. This action can be performed for each knob and associated hook, either one by one or simultaneously. The ladder stabilizer unit 1000 can then be detached completely from the ladder 705 as the extension member 1035 and the extension member 1040 can be slid out of the rungs 710 and 725, respectively, of the ladder 705.

Figure 11:
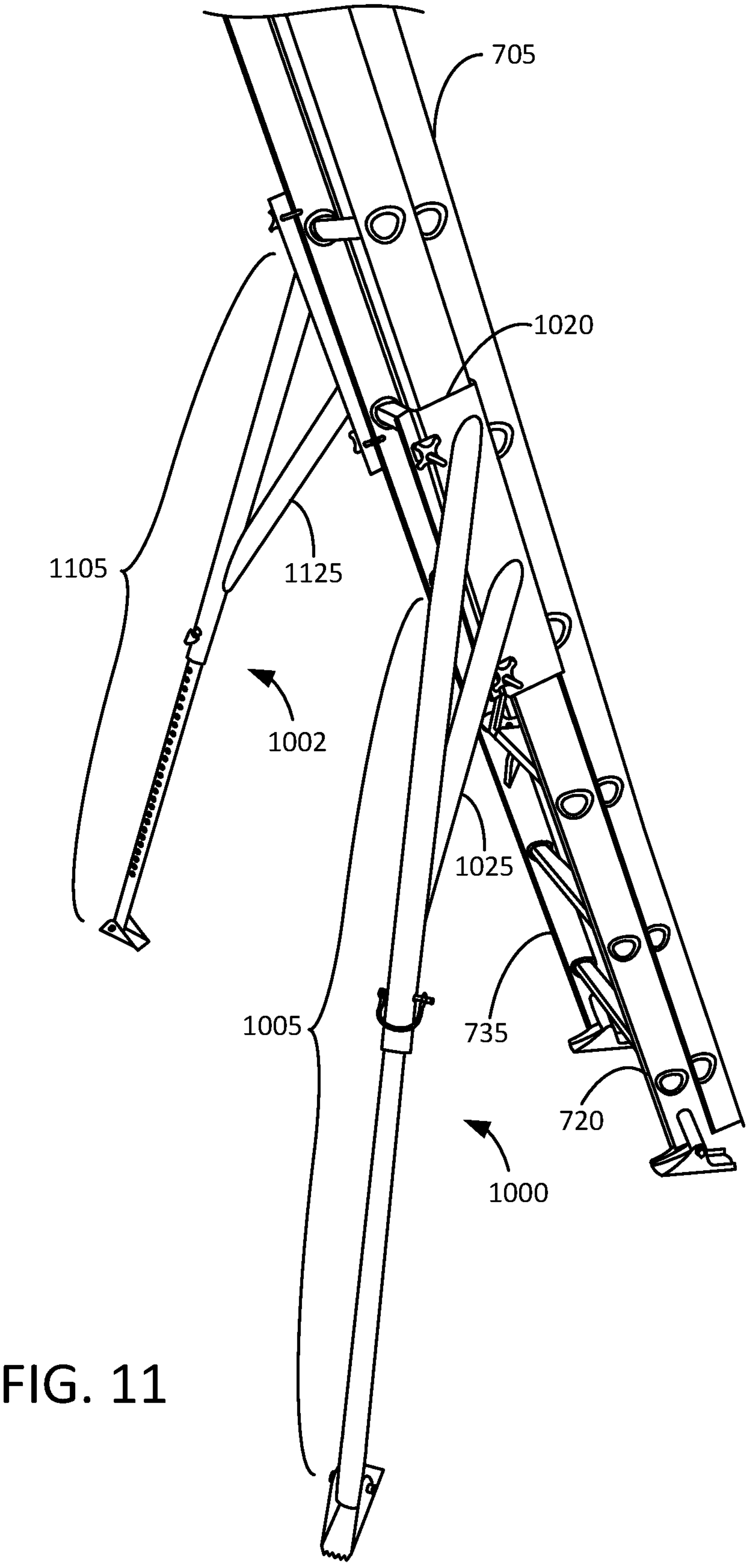
FIG. 11 is a perspective view of the ladder stabilizer unit and another ladder stabilizer unit attached to the ladder according to an embodiment of the present disclosure.

FIG. 11 is a perspective view of the ladder stabilizer unit 1000 and the ladder stabilizer unit 1002 attached to the ladder 705 according to an embodiment of the present disclosure. The leg member 1005 and the leg member 1105 can outwardly extend from a plane defined by the ladder 705 at an oblique angle to the plane to provide both lateral and forward stability to the ladder 705. In other words, the side rail 720, the side rail 735, and the rungs of a ladder can exist in a particular mathematical plane. The leg member 1005 and the leg member 1105 can extend forward relative to the particular plane, to provide forward support to the latter 705. The angle at which the leg members 1005 and 1105 meet the plane can be oblique. Put differently, the leg members 1005 and 1105 can be attached to a surface of their corresponding brackets (e.g., 1020) at an angle that causes them not only to extend laterally away from the ladder 705, but also to extend in a forward direction to provide vertical support to the ladder 705. The support arm member 1025 and the support arm member 1125 can also outwardly extend from the particular plane defined by the ladder 705 at an oblique angle to the particular plane to provide both lateral and forward stability to the ladder 705.

In this manner, the feet of the ladder 705 are prevented from sliding out from underneath a person on the ladder 705. In other words, an advantage of embodiments disclosed herein include a slide out prevention protection, which prevents the ladder from slipping or sliding on a slippery surface, for example. The leg members (e.g., 1005 and 1105) of the ladder stabilizer units (e.g., 1000 and 1002) that are forward of the feet of the ladder 705, stabilize the ladder 705, and prevent slide out of the ladder 705.

Figure 12:
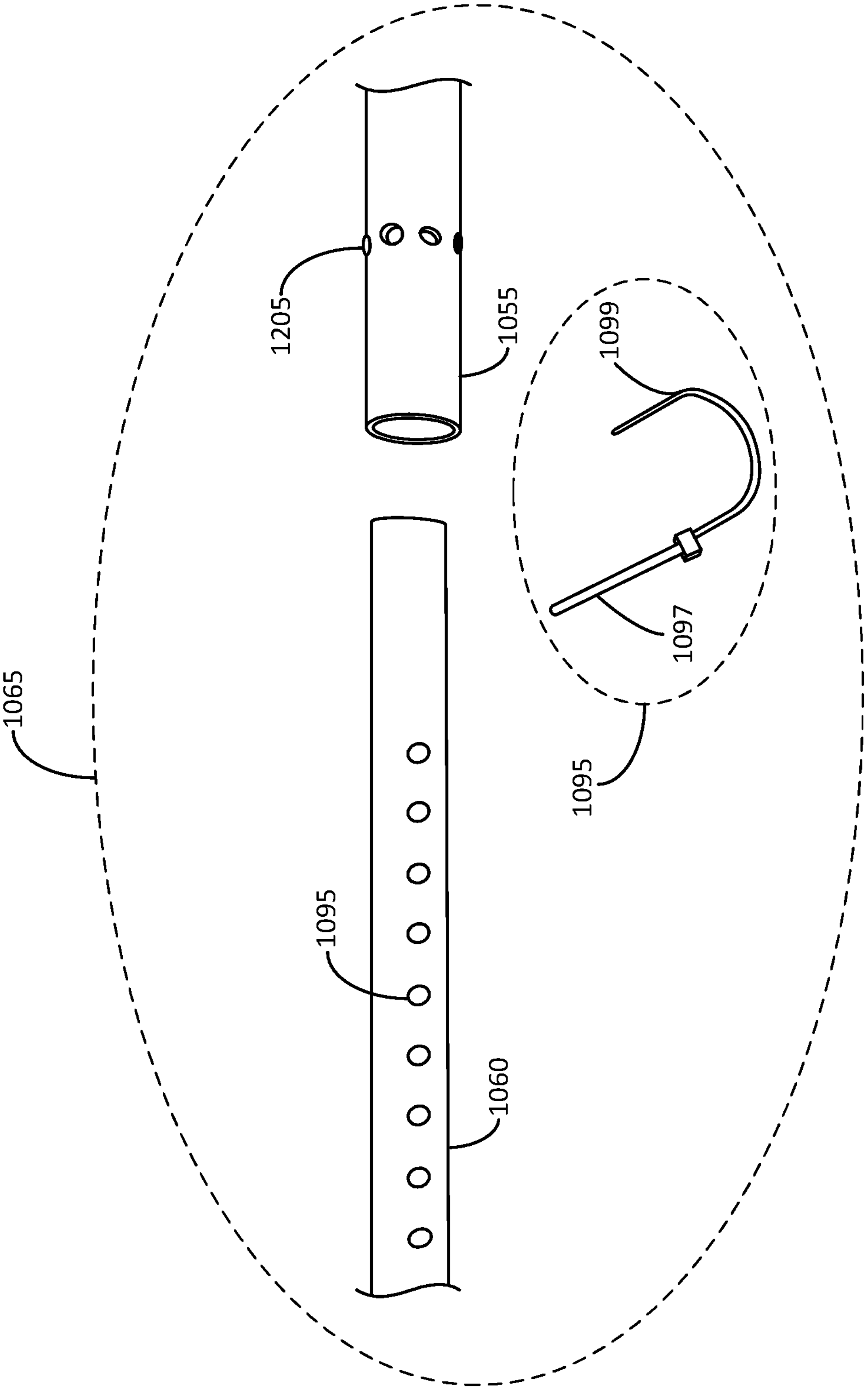
FIG. 12 is a close-up view of the attachment means of FIG. 6 in a disassembled configuration according to an embodiment of the present disclosure.
Figure 13:
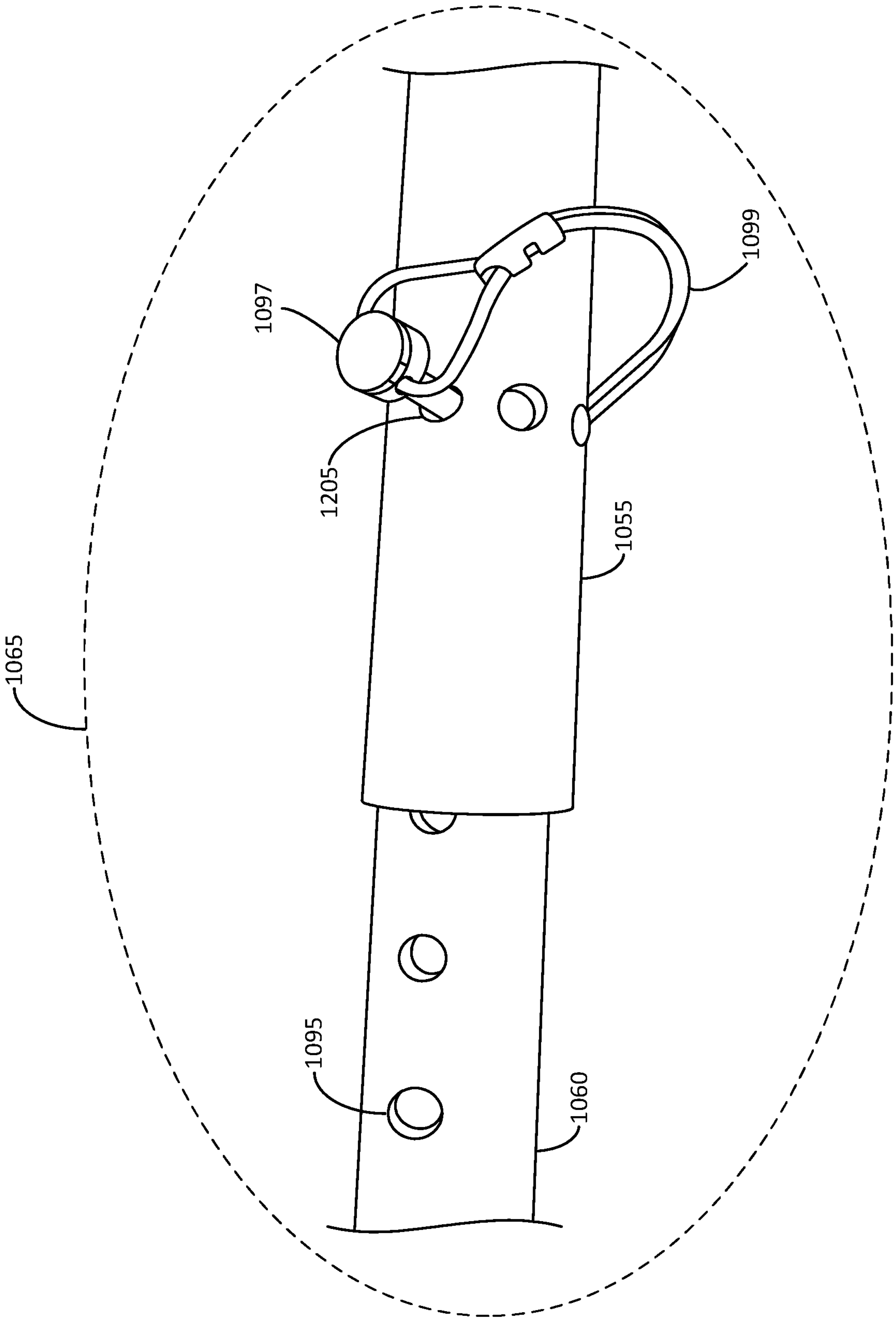
FIG. 13 is another close-up view of the attachment means of FIG. 6 in an assembled configuration according to an embodiment of the present disclosure.

FIG. 12 is a close-up view of the attachment means 1065 of FIG. 6 in a disassembled configuration according to an embodiment of the present disclosure. FIG. 13 is another close-up view of the attachment means 1065 of FIG. 6 in an assembled configuration according to an embodiment of the present disclosure. Reference is now made to FIGS. 12 and 13.

The first section 1055 of the leg member 1005 can include holes 1205 disposed circumferentially around the first section 1055. The second section 1060 can include holes 1095 lined up linearly along the second section 1060 of the leg member 1005. Each of the holes 1095 can pass all the way through the second section 1060.

The first section 1055 can be removably attached to the second section 1060 using the attachment means 1065. The attachment means 1065 can include the locking mechanism 1095 having the pin 1097 and the bow 1099. The pin 1097 can extend through the first section 1055 and the second section 1060. For example, the second section 1060 can be slid into the first section 1055, and one of the holes 1095 can be lined up with one of the holes 1205. The length of the leg member 1005 can be adjusted based on which hole 1095 is selected. The pin 1097 can then be inserted through the lined-up holes. The bow 1099 can then be hooked to an end of the pin 1097, thereby holding the pin 1097 in the holes, and thereby securing a particular length of the leg member 1005. The bow 1099 can be partially removed from the pin 1097. For example, the bow 1099 can be detached from one end of the pin 1097 so that the pin 1097 can be slid out of the lined-up holes. Otherwise, when the bow 1099 is attached to the ends of the pin 1097, and the pin 1097 is disposed through the first section 1055 and the second section 1060, the leg member 1005 can be held at a fixed length. Each of the leg members (e.g., 1005) of each of the ladder stabilizer units (e.g., 1000) can be set to have a same fixed length or a different fixed length.

Figure 14:
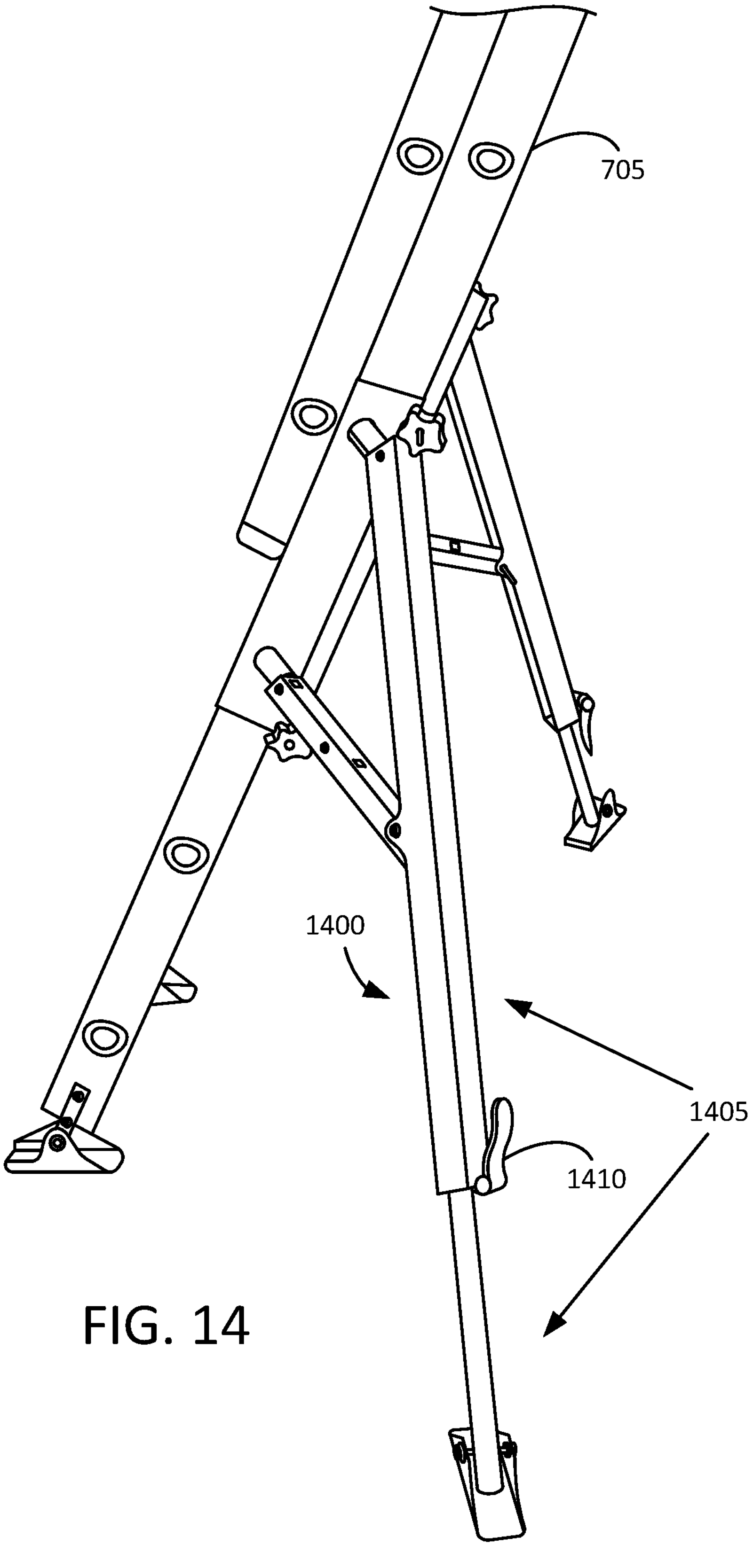
FIG. 14 is a perspective view of a ladder stabilizer unit according to an embodiment of the present disclosure.

FIG. 14 is a perspective view of a ladder stabilizer unit 1400 according to an embodiment of the present disclosure. The ladder stabilizer unit 1400 can include a telescoping leg member 1405. The telescoping leg member 1405 can include a lever 1410. When the user places the lever 1410 in a first position, a length of the telescoping leg member 1405 can be freely adjusted. When the user places the lever 1410 in a second position, the length of the telescoping leg member 1405 can be firmly fixed. This can provide a convenient form of adjusting and setting a particular length of the telescoping leg member 1405 of the ladder stabilizer unit 1400.

Figure 15:
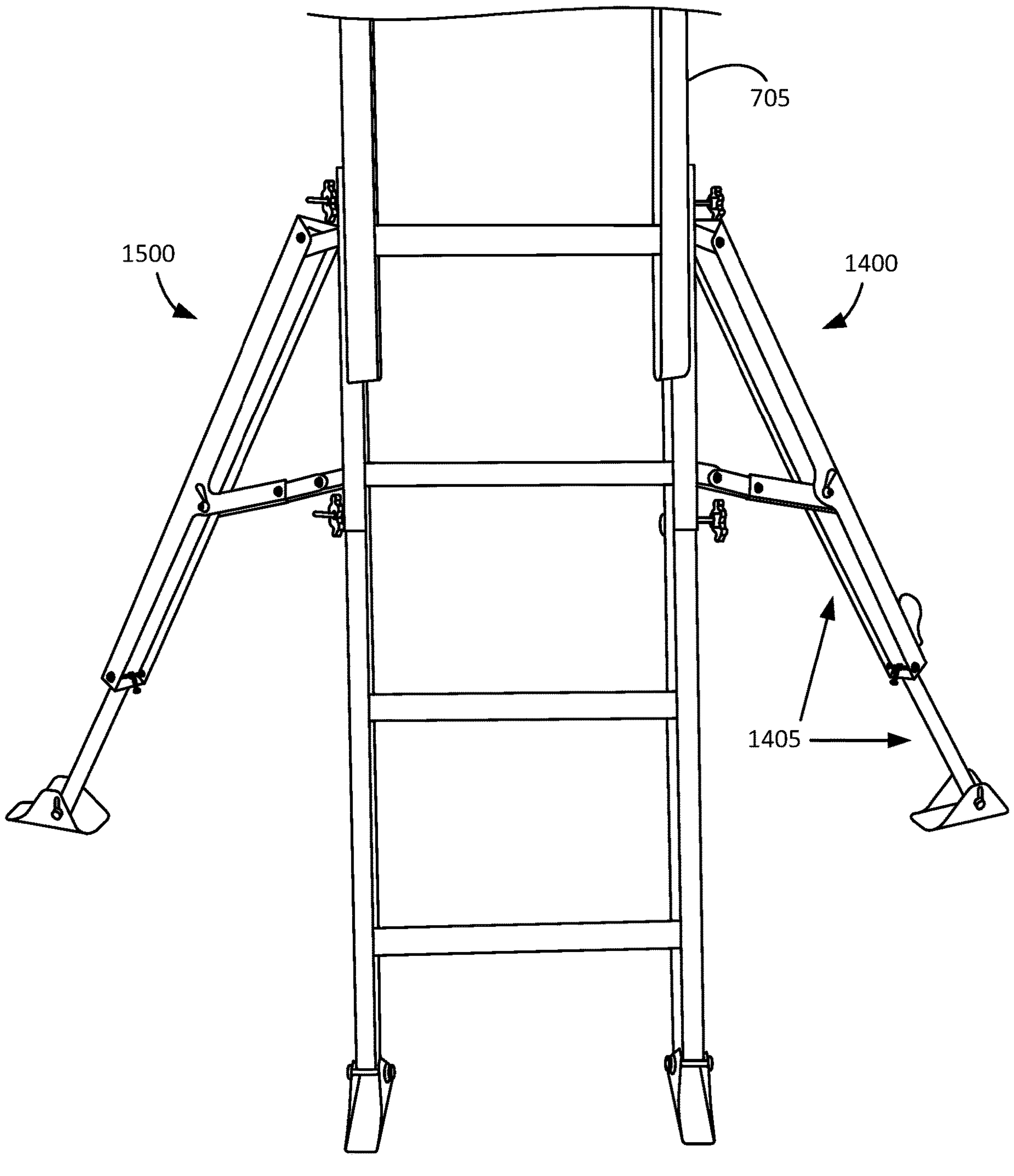
FIG. 15 is a front view of the ladder 705, the ladder stabilizer unit, and a ladder stabilizer unit according to an embodiment of the present disclosure.

FIG. 15 is a front view of the ladder 705, the ladder stabilizer unit 1400, and a ladder stabilizer unit 1500 according to an embodiment of the present disclosure. Each of the ladder stabilizer unit 1400 and a ladder stabilizer unit 1500 can include a telescoping leg member (e.g., 1405).

Figure 16:
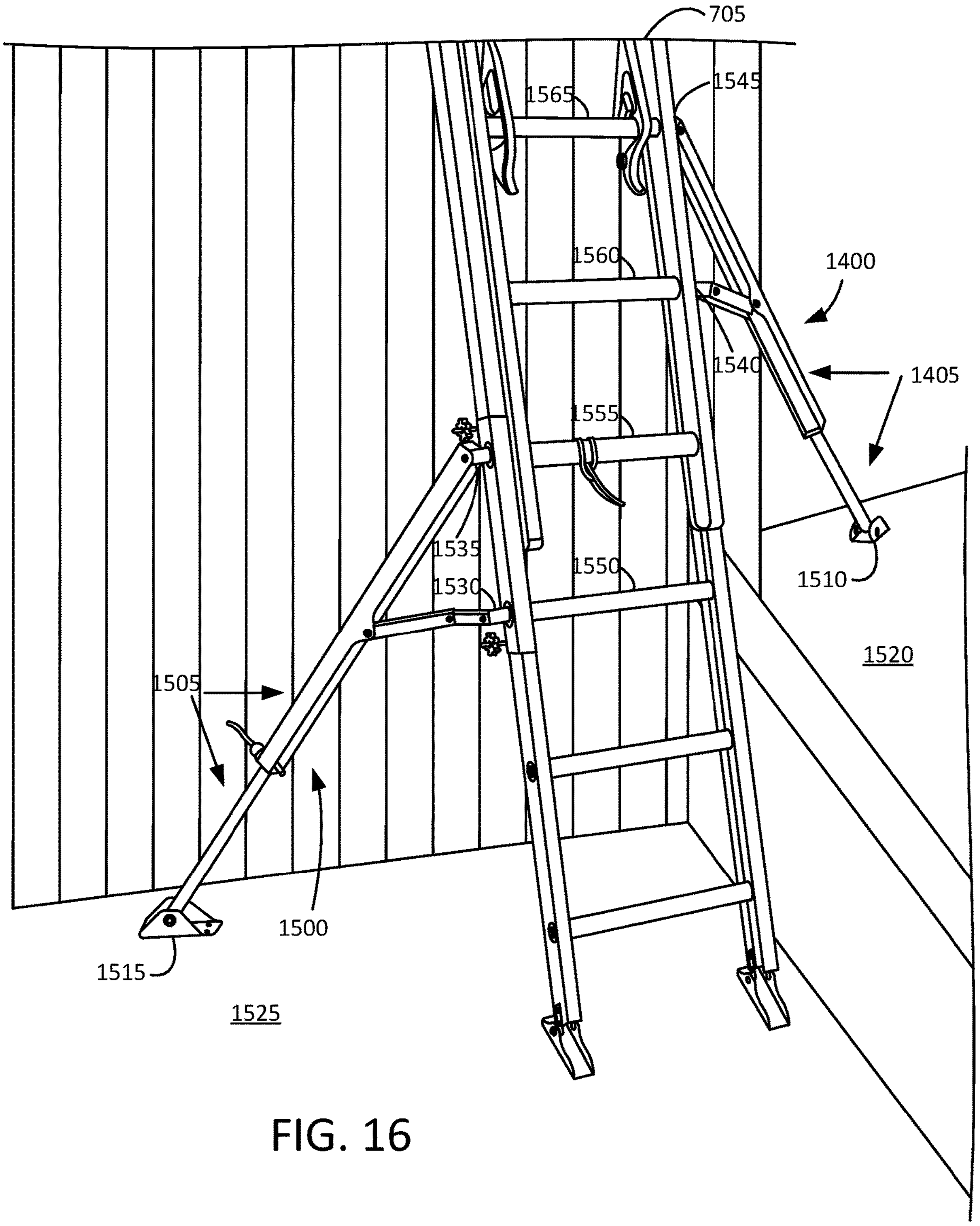
FIG. 16 is a perspective view of the ladder, the ladder stabilizer unit adjusted to a higher surface elevation, and a ladder stabilizer unit adjusted to a lower surface elevation according to an embodiment of the present disclosure.

FIG. 16 is a perspective view of the ladder 705. The ladder stabilizer unit can be 1400 adjusted to a higher surface elevation, and a ladder stabilizer unit 1500 can be adjusted to a lower surface elevation according to an embodiment of the present disclosure. The leg member 1405 of the ladder stabilizer unit 1400 can have a first length. The leg member 1505 can have a second length that is greater than or less than the first length. The foot member 1510 can rest on a first surface 1520. The foot member 1515 can rest on a second surface 1525. The second surface 1525 can be lower in elevation than the first surface 1520, for example. This allows the ladder 705 to be secured and stabilized even when there are obstacles and/or difficult terrain.

The first extension members (e.g., 1035, 1040 of FIG. 6) can be inserted into different rungs of the ladder 750. For example, an extension member 1530 can be inserted into a rung 1550 of the ladder 705. An extension member 1535 can be inserted into a rung 1555 of the ladder 705 that is different from the rung 1550. An extension member 1540 can be inserted into a rung 1560 of the ladder 705 that is different from the rungs 1550 and 1555. An extension member 1545 can be inserted into a rung 1565 of the ladder 705 that is different from the rungs 1550, 1555, and 1560. It will be understood that the configuration illustrated in FIG. 16 can be applicable to all of the ladder stabilizer units (e.g., 1000, 1002, 1400, 1500, etc.) disclosed herein.

Figure 17:
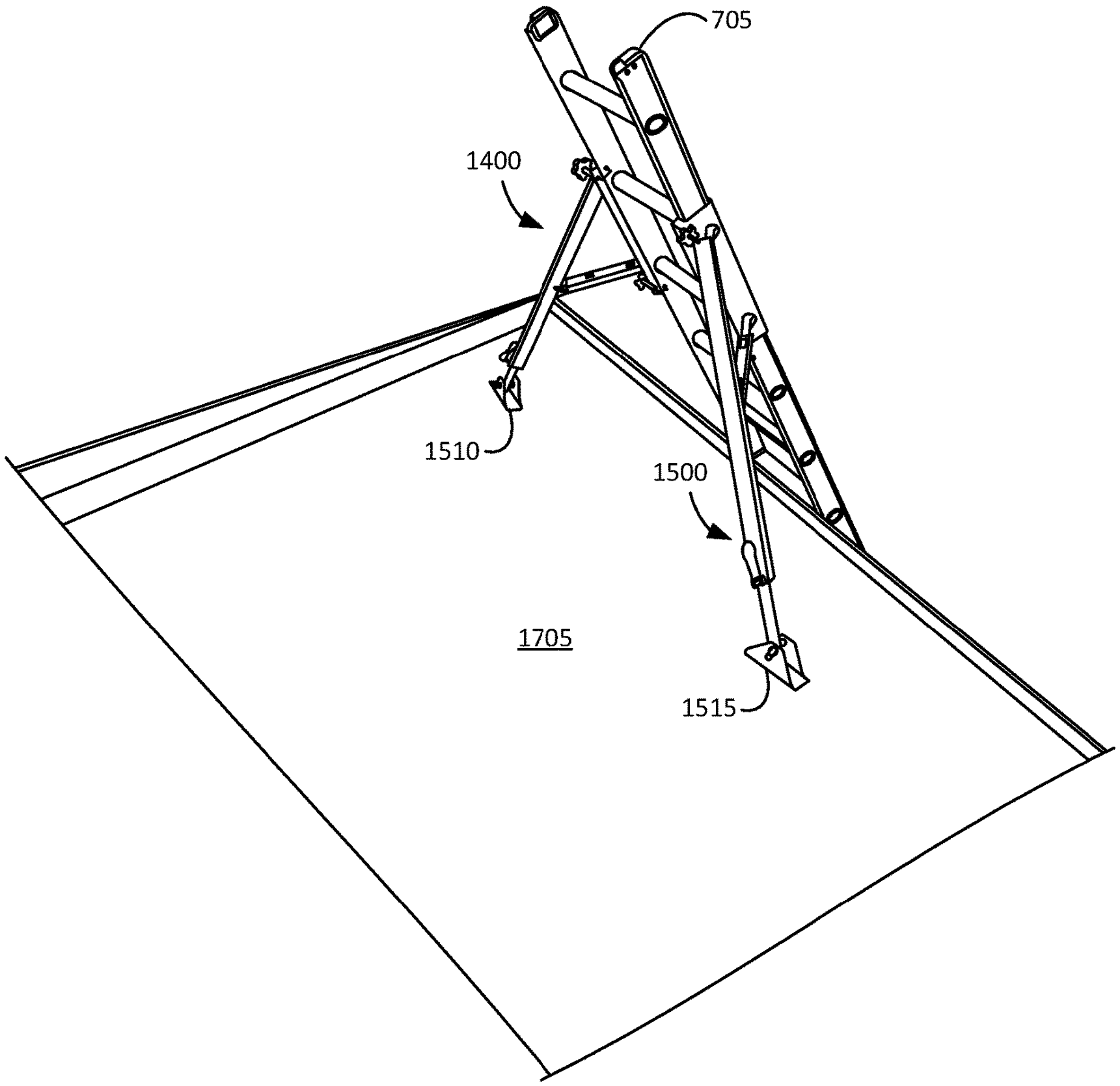
FIG. 17 is a perspective view of the ladder, the ladder stabilizer unit adjusted to a higher surface elevation, and a ladder stabilizer unit adjusted to the higher surface elevation according to an embodiment of the present disclosure.

FIG. 17 is a perspective view of the ladder 705. The ladder stabilizer unit 1400 can be adjusted to a higher surface elevation, and a ladder stabilizer unit 1500 can be adjusted to the higher surface elevation according to an embodiment of the present disclosure. In some embodiments, an extension ladder 705 can be used to access a high surface 1705 such as a roof. The ladder stabilizer units 1400 and 1500 can be placed on upper rungs of the ladder 705 so that the foot members (e.g., 1510, 1515) of the ladder stabilizer units (e.g., 1400, 1500) can rest on the high surface such 1705 as the roof. This provides safety and security to those who climb to otherwise unsafe elevations using the ladder 705. It will be understood that the configurations illustrated in FIG. 17 can be applicable to all of the ladder stabilizer units (e.g., 1000, 1002, 1400, 1500, etc.) disclosed herein.

Some embodiments disclosed herein include a support system for providing support to an extension ladder. The support system can include a leg member having a first end and a second end. The support system can include a bracket member attached to the first end of the leg member. The support system can include a support arm member attached to the leg member and to the bracket member. The support system can include a foot member attached to the second end of the leg member. The support system can include a first extension member that extends from a surface of the bracket member. The support system can include a second extension member that extends from the surface of the bracket member. The support system can include first fastening means for attaching the bracket member to the ladder. The support system can include second fastening means for attaching the bracket member to the ladder.

In some embodiments, the first extension member is configured to be inserted into a first rung of the ladder. In some embodiments, the second extension member is configured to be inserted into a second rung of the ladder. In some embodiments, the first fastening means is configured to fasten the bracket member to a side rail of the ladder, and the second fastening means is configured to fasten the bracket member to the side rail of the ladder. In some embodiments, the leg member includes a first section and a second section. In some embodiments, the second section is smaller in size than the first section, and wherein the second section partially fits within the first section.

In some embodiments, the first section is removably attached to the second section using an attachment means. In some embodiments, the foot member includes a plurality of ridges of non-slip material on a surface thereof. In some embodiments, the leg member is a first leg member, the bracket member is a first bracket member, the support arm member is a first support arm member, the foot member is a first foot member.

The support system can include a first ladder stabilizer unit including the first leg member, the first bracket member, the first support arm member, the first foot member, the first extension member, the second extension member, the first fastening means, and the second fastening means. The support system can include a second ladder stabilizer unit. The second ladder stabilizer can include a second leg member having a first end and a second end. The second ladder stabilizer can include a second bracket member attached to the first end of the second leg member. The second ladder stabilizer can include a second support arm member attached to the second leg member and to the bracket member. The second ladder stabilizer can include a second foot member attached to the second end of the second leg member. The second ladder stabilizer can include a third extension member that extends from the surface of the bracket member. The second ladder stabilizer can include a fourth extension member that extends from the surface of the bracket member. The second ladder stabilizer can include third fastening means for attaching the bracket member to the ladder. The second ladder stabilizer can include fourth fastening means for attaching the bracket member to the ladder.

In some embodiments, the first leg member has a first length. In some embodiments, the second leg member has a second length that is greater than the first length. In some embodiments, the first foot member is configured to rest on a first surface. In some embodiments, the second foot member is configured to rest on a second surface. In some embodiments, the second surface is lower than the first surface.

In some embodiments, the first extension member is configured to be inserted into a first rung of the ladder. In some embodiments, the second extension member is configured to be inserted into a second rung of the ladder that is different from the first rung. In some embodiments, the third extension member is configured to be inserted into a third rung of the ladder that is different from the first and second rungs. In some embodiments, the fourth extension member is configured to be inserted into a fourth rung of the ladder that is different from the first, second, and third rungs.

In some embodiments, the first extension member is configured to be inserted into a first rung of the ladder. In some embodiments, the second extension member is configured to be inserted into a second rung of the ladder that is different from the first rung. In some embodiments, the third extension member is configured to be inserted into the first rung. In some embodiments, the fourth extension member is configured to be inserted into the second rung.

In some embodiments, the first leg member and the second leg member outwardly extend from a plane defined by the ladder at an oblique angle to the plane to provide both lateral and forward stability to the ladder. In some embodiments, the first fastening means includes a first knob, a first spring, a first hook, and a first shaft. In some embodiments, the first knob is attached to the first shaft. In some embodiments, the first spring is disposed between the first knob and the bracket member. In some embodiments, the first knob is configured to compress the first spring. In some embodiments, the first hook is connected to the first shaft, and is configured to extend and hook a side rail of the ladder such that the bracket member is held in contact with the side rail by decompression of the first spring. In some embodiments, the second fastening means includes a second knob, a second spring, a second hook, and a second shaft. In some embodiments, the second knob is attached to the second shaft. In some embodiments, the second spring is disposed between the second knob and the bracket member. In some embodiments, the second knob is configured to compress the second spring. In some embodiments, the second hook is connected to the second shaft, and is configured to extend and hook the side rail of the ladder such that the bracket member is held in contact with the side rail by decompression of the second spring.

In some embodiments, the leg member includes a first section and a second section. In some embodiments, the second section is smaller in size than the first section. In some embodiments, the second section partially fits within the first section. In some embodiments, the second section includes one or more holes that extend through the second section. In some embodiments, the first section is removably attached to the second section using an attachment means. In some embodiments, the attachment means includes a locking mechanism having a pin and a bow. In some embodiments, the pin is configured to extend through the one or more holes. In some embodiments, the bow is configured to hold the pin in the one or more holes.

Some embodiments disclosed herein include a support system for providing support to a ladder against a structure. The support system can include a first support arm having an upper end and a lower end, wherein the first support arm is a telescoping support arm that is configured to extend the first support arm in a first outward direction. The support system can include a second support arm having an upper end and a lower end, wherein the second support arm is a telescoping support arm that is configured to extend the second support arm in a second outward direction. The support system can include a first support leg removably attached to the lower end of the first support arm. The support system can include a second support leg removably attached to the lower end of the second support arm. The support system can include a first support base coupled to the first support leg and having a plurality of ridges on a lower surface of the first support base. The support system can include a second support base coupled to the second support leg and having a plurality of ridges on a lower surface of the second support base. The support system can include a first support bracket attached to the upper end of the first support arm. The support system can include a second support bracket attached to the upper end of the second support arm. The support system can include a first ladder coupling means attached to the first support bracket. The support system can include a second ladder coupling means attached to the second support bracket. The support system can include a first fastening means located on the lower end of the first support arm. The support system can include a second fastening means located on the lower end of the second support arm.

In some embodiments, the first fastening means is configured to removably attach the first support arm to the first support leg. In some embodiments, the second fastening means is configured to removably attach the second support arm to the second support leg. In some embodiments, the support system is configured to provide lateral and vertical support and relative stability to the ladder. In some embodiments, the first support arm is comprised of two sections. In some embodiments, a first of the two sections is smaller in size than a second of the two sections. In some embodiments, the first section is removably attached to the second section via an attachment means. In some embodiments, the plurality of ridges is arranged in a radial configuration. In some embodiments, the first support leg is configured to pivot relative to the first support arm, and the second support leg is configured to pivot relative to the second support arm. In some embodiments, the lower surface of the first support base and the lower surface of the second support base are each made of a non-slip material.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A support system for providing support to an extension ladder, the support system comprising:

a leg member having a first end and a second end;

a bracket member attached to the first end of the leg member;

a support arm member attached to the leg member and to the bracket member;

a foot member attached to the second end of the leg member;

a first extension member that extends from a surface of the bracket member;

a second extension member that extends from the surface of the bracket member;

a first fastener for attaching the bracket member to the ladder; and a second fastener for attaching the bracket member to the ladder, wherein:

the first fastener includes a first knob, a first spring, a first hook, and a first shaft;

the first knob is attached to the first shaft;

the first knob is directly attached to the first spring;

the first spring is disposed between the first knob and the bracket member;

the first knob is configured to compress the first spring;

the first hook is directly connected to the first shaft, and is configured to extend and directly hook a side rail of the ladder such that the bracket member is held in contact with the side rail by decompression of the first spring;

the second fastener includes a second knob, a second spring, a second hook, and a second shaft;

the second knob is attached to the second shaft;

the second knob is directly attached to the second spring;

the second spring is disposed between the second knob and the bracket member;

the second knob is configured to compress the second spring; and the second hook is directly connected to the second shaft, and is configured to extend and directly hook the side rail of the ladder such that the bracket member is held in contact with the side rail by decompression of the second spring.

2. The support system of claim 1, wherein the first extension member is configured to be inserted into a first rung of the ladder, and the second extension member is configured to be inserted into a second rung of the ladder.

3. The support system of claim 1, wherein the first fastener is configured to fasten the bracket member to a side rail of the ladder, and the second fastener is configured to fasten the bracket member to the side rail of the ladder.

4. The support system of claim 1, wherein the leg member includes a first section and a second section.

5. The support system of claim 4, wherein the second section is smaller in size than the first section, and wherein the second section partially fits within the first section.

6. The support system of claim 5, wherein the first section is removably attached to the second section using a locking mechanism having a pin and a bow.

7. The support system of claim 1, wherein the foot member includes a plurality of ridges of non-slip material on a surface thereof.

8. The support system of claim 1, wherein the leg member is a first leg member, the bracket member is a first bracket member, the support arm member is a first support arm member, the foot member is a first foot member, and the system further comprises:

a first ladder stabilizer unit including the first leg member, the first bracket member, the first support arm member, the first foot member, the first extension member, the second extension member, the first fastener, and the second fastener; and a second ladder stabilizer unit, including:

a second leg member having a first end and a second end;

a second bracket member attached to the first end of the second leg member;

a second support arm member attached to the second leg member and to the second bracket member;

a second foot member attached to the second end of the second leg member;

a third extension member that extends from the surface of the second bracket member;

a fourth extension member that extends from the surface of the second bracket member;

a third fastener for attaching the second bracket member to the ladder; and a fourth fastener for attaching the second bracket member to the ladder.

9. The support system of claim 8, wherein:

the first leg member has a first length;

the second leg member has a second length that is greater than the first length;

the first foot member is configured to rest on a first surface;

the second foot member is configured to rest on a second surface; and the second surface is lower than the first surface.

10. The support system of claim 8, wherein:

the first extension member is configured to be inserted into a first rung of the ladder;

the second extension member is configured to be inserted into a second rung of the ladder that is different from the first rung;

the third extension member is configured to be inserted into a third rung of the ladder that is different from the first and second rungs; and the fourth extension member is configured to be inserted into a fourth rung of the ladder that is different from the first, second, and third rungs.

11. The support system of claim 8, wherein:

the first extension member is configured to be inserted into a first rung of the ladder;

the second extension member is configured to be inserted into a second rung of the ladder that is different from the first rung;

the third extension member is configured to be inserted into the first rung; and the fourth extension member is configured to be inserted into the second rung.

12. The support system of claim 8, wherein;

the first leg member is configured to outwardly extend from a first plane defined by a first side of the ladder at a first oblique angle to the first plane to provide both lateral and forward stability to the ladder;

the first leg member is further configured to outwardly extend from a second plane defined by a second side of the ladder at a second oblique angle to the second plane to provide both lateral and forward stability to the ladder;

the second leg member is configured to outwardly extend from the second plane defined by the second side of the ladder at a third oblique angle to the second plane to provide both lateral and forward stability to the ladder; and the second leg member is further configured to outwardly extend from a third plane defined by a third side of the ladder at a fourth oblique angle to the third plane to provide both lateral and forward stability to the ladder.

13. The support system of claim 1, wherein:

the leg member includes a first section and a second section;

the second section is smaller in size than the first section;
the second section partially fits within the first section;
the second section includes one or more holes that extend through the second section;
the first section is removably attached to the second section using a locking mechanism having a pin and a bow;
the pin is configured to extend through the one or more holes; and
the bow is configured to hold the pin in the one or more holes.

14. The support system of claim 1, wherein:
the support arm is comprised of two sections; and
a first of the two sections is smaller in size than a second of the two sections.

15. The support system of claim 8, wherein a lower surface of the first foot member and a lower surface of the second foot member are each made of a non-slip material.

16. The support system of claim 1, wherein:
a terminal end of the first hook is configured to be disposed at a first interior location of the side rail of the ladder; and
a terminal end of the second hook is configured to be disposed at a second interior location of the side rail of the ladder.

17. The support system of claim 16, wherein:
the first hook is configured to be released from the first interior location responsive to a compression of the first spring using the first knob; and
the second hook is configured to be released from the second interior location responsive to a compression of the second spring using the second knob.

* * * * *